US011701671B2

(12) United States Patent
Boerner

(10) Patent No.: US 11,701,671 B2
(45) Date of Patent: Jul. 18, 2023

(54) APPLICATION DEVICE FOR COATING COMPONENTS WITH A COATING AGENT

(71) Applicant: ABB Schweiz AG, Baden (CH)

(72) Inventor: Gunter Boerner, Sinsheim (DE)

(73) Assignee: ABB Schweiz AG, Baden (CH)

( * ) Notice: Subject to any disclaimer, the term of this patent is extended or adjusted under 35 U.S.C. 154(b) by 437 days.

(21) Appl. No.: 16/679,352

(22) Filed: Nov. 11, 2019

(65) Prior Publication Data

US 2020/0070182 A1 Mar. 5, 2020

Related U.S. Application Data

(63) Continuation of application No. PCT/EP2018/060824, filed on Apr. 27, 2018.

(30) Foreign Application Priority Data

May 12, 2017 (DE) ..................... 10 2017 110 316.3

(51) Int. Cl.

| | |
|---|---|
| ***B05B 1/08*** | (2006.01) |
| ***B05B 9/04*** | (2006.01) |
| ***B05B 12/04*** | (2006.01) |
| ***G01F 11/08*** | (2006.01) |
| ***B05C 5/02*** | (2006.01) |
| *B25J 11/00* | (2006.01) |

(52) U.S. Cl.

CPC ................ *B05B 1/086* (2013.01); *B05B 9/04* (2013.01); *B05B 12/04* (2013.01); *B05C 5/02* (2013.01); *B05C 5/0275* (2013.01); *G01F 11/088* (2013.01); *B25J 11/0075* (2013.01)

(58) Field of Classification Search

None

See application file for complete search history.

(56) References Cited

U.S. PATENT DOCUMENTS

| | | | | |
|---|---|---|---|---|
| 5,741,554 A | | 4/1998 | Tisone | |
| 5,807,437 A | * | 9/1998 | Sachs | B29C 41/12 118/688 |
| 6,146,567 A | * | 11/2000 | Sachs | B29C 41/36 264/113 |

(Continued)

FOREIGN PATENT DOCUMENTS

| | | |
|---|---|---|
| DE | 102017101937 A1 | 8/2018 |
| FR | 2990421 A1 | 11/2013 |
| WO | 2010107445 A1 | 9/2010 |

*Primary Examiner* — Jethro M. Pence

(74) *Attorney, Agent, or Firm* — Leydig, Voit & Mayer, Ltd.

(57) ABSTRACT

An application device for coating components with a coating agent includes: a print head having several individual nozzles for discharging the coating agent; and a nozzle valve attached to each individual nozzle, each nozzle valve being openable for a valve opening time to discharge the coating agent from the respective nozzle. Each nozzle valve is assigned in each case a nozzle valve supply line, which nozzle valve supply line, at an outlet opening thereof, supplies the coating agent to the respective nozzle valve. Each nozzle valve supply line has an inlet opening to be closed or shut off such that a quantity of the coating agent that is metered in a defined manner or a volume of the coating agent that is metered in a defined manner is receivable in a closed off manner within the nozzle valve supply line.

12 Claims, 7 Drawing Sheets

(56) References Cited

U.S. PATENT DOCUMENTS

| | | | | |
|---|---|---|---|---|
| 2005/0255249 | A1 * | 11/2005 | Schlatterbeck | B05D 1/36<br>427/372.2 |
| 2011/0306930 | A1 * | 12/2011 | Moersch | A61M 5/158<br>604/151 |
| 2017/0232733 | A1 * | 8/2017 | Rupprecht | G06K 15/1825<br>347/14 |
| 2018/0326726 | A1 * | 11/2018 | Wang | B41J 2/045 |
| 2020/0023396 | A1 | 1/2020 | Boerner | |

* cited by examiner

| | Modulus of elasticity | Poisson's ratio | |
|---|---|---|---|
| | $N/mm^2$ | | |
| Steel | 215 000 | 0.3 | Material data |
| Aluminum alloys | 70 000 | 0.33 | |
| Titanium alloys | 120 000 | 0.35 | |
| PA | 1500...3000 | | Material data |
| PE | 1000 | | |
| PP | 1300 | | |
| PVC | 3000 | | |
| PET | 3000 | | |
| FEP | 350...700 | | Material-daten |
| PTFE | 400...800 | | |
| PFA | 650 | | |
| ETFE | 500...1200 | | |
| PCTFE | 1000...1200 | | |
| PVDF | 1800 | | |
| ECTFE | 1200....1800 | | |

Fig. 4

| | Modulus of elasticity | Poisson's ratio |
|---|---|---|
| | $N/mm^2$ | |
| Plastics | 1200 | 0.4 |

| Hose | Radius | | $C^*$ | |
|---|---|---|---|---|
| | inner | outer | calculated | measured |
| | mm | | ml/Mpa/m | |
| 4x5 | 2 | 2.5 | 0.26 | |
| 4x6 | 2 | 3 | 0.16 | 0.13 |
| 6x8 | 3 | 4 | 0.42 | |
| 6x9 | 3 | 4.5 | 0.32 | 0.29 |
| 7x10 | 3.5 | 5 | 0.47 | 0.45 |
| 7x11 | 3.5 | 5.5 | 0.40 | 0.34 |
| 8x10 | 4 | 5 | 0.87 | 1.02 |
| 8x12 | 4 | 6 | 0.55 | 0.51 |
| 9x12 | 4.5 | 6 | 0.89 | 0.97 |

Fig. 5

| | Modulus of elasticity | Poisson's ratio |
|---|---|---|
| | $N/mm^2$ | |
| Plastics | 1200 | 0.4 |

| Pressure | Volume of a drop |
|---|---|
| Mpa | ml |
| 0.2 | 0.0002 |

| Hose | Radius | | $C^*$ | Length |
|---|---|---|---|---|
| | inner | outer | calculated | |
| | mm | | ml/Mpa/m | mm |
| 1 | 0.75 | 1.5 | 0.02422 | 41.3 |
| 4x5 | 2 | 2.5 | 0.25947 | 3.9 |
| 4x6 | 2 | 3 | 0.15708 | 6.4 |
| 6x8 | 3 | 4 | 0.41738 | 2.4 |
| 6x9 | 3 | 4.5 | 0.32201 | 3.1 |
| 7x10 | 3.5 | 5 | 0.47037 | 2.1 |
| 7x11 | 3.5 | 5.5 | 0.39865 | 2.5 |
| 8x10 | 4 | 5 | 0.87034 | 1.1 |
| 8x12 | 4 | 6 | 0.55292 | 1.8 |
| 9x12 | 4.5 | 6 | 0.88862 | 1.1 |

Rough estimation

| | |
|---|---|
| Nozzle resistance | 0.06 bar s / ml |
| Discharge time | 0.018 ms |

Fig. 6

| | Modulus of elasticity | Poisson's ratio |
|---|---|---|
| | N/mm² | |
| Plastics | 210 000 | 0.3 |

| Pressure | Volume of a drop |
|---|---|
| Mpa | ml |
| 0.2 | 0.0002 |

| Hose | Radius | | $C^*$ | Length |
|---|---|---|---|---|
| | inner | outer | calculated | |
| | mm | | ml/Mpa/m | mm |
| | 0.75 | 1 | 0.00039 | 2536.1 |
| | 2 | 2.25 | 0.00264 | 378.5 |
| | 2 | 2.5 | 0.00145 | 688.3 |
| | 3 | 3.5 | 0.00388 | 257.8 |
| | 3 | 3.25 | 0.00712 | 140.4 |
| | 3.5 | 4 | 0.00577 | 173.4 |
| | 3.5 | 3.75 | 0.01066 | 93.8 |
| | 4 | 5 | 0.00469 | 213.0 |
| | 4 | 4.5 | 0.00820 | 121.9 |
| | 4.5 | 5 | 0.01126 | 88.8 |

Rough estimation

| | |
|---|---|
| Nozzle resistance | 0.06 bar s / ml |
| Discharge time | 0.018 ms |

Fig. 7

APPLICATION DEVICE FOR COATING COMPONENTS WITH A COATING AGENT

CROSS-REFERENCE TO PRIOR APPLICATION

This application is a continuation of International Patent Application No. PCT/EP2018/060824, filed on Apr. 27, 2018, which claims priority to German Patent Application No. DE 10 2017 110 316.3, filed on May 12, 2017. The entire disclosure of both applications is hereby incorporated by reference herein.

FIELD

The invention relates to an application device for coating components with a coating agent. Such an application device comprises a print head with several nozzles from which the coating agent can be discharged, wherein a nozzle valve is attached to each individual nozzle, which nozzle valve can be opened for a valve opening time in order to discharge the coating agent from the respective nozzle, and wherein each nozzle valve is assigned in each case a nozzle valve supply line which, at its outlet opening, supplies the coating agent to the respective nozzle valve.

BACKGROUND

Against this background, DE 10 2017 101 937.5 discloses an application device which has several nozzles arranged in parallel for the discharge of coating agent. Each nozzle is assigned a nozzle valve. A respective nozzle valve is opened if a drop or volume of the coating agent is supposed to leave the respective nozzle. The nozzle valve is opened during a defined valve opening time. After the valve opening time, the nozzle valve is closed again.

The coating agent can be conveyed with a pump, in particular a gear pump, via a central coating agent supply line into the application device and distributed there evenly to the nozzles. In this case, a pressure is built up within the application device, which pressure acts on the nozzle valves if these are closed. The pressure can be reduced at a nozzle with output of a volume of the coating agent if a nozzle valve is opened.

Although a uniform output pressure acts on all the nozzles, different escaping volumes of coating agent and thus different drop sizes at different nozzles can occur during a likewise uniform valve opening time at different nozzles.

In the case of an arrangement with a plurality of nozzles arranged in parallel, it is namely problematic that even small differences in nozzle diameters, nozzle lengths or further differences in nozzle geometries or nozzle properties can lead to non-uniform volumes exiting at different nozzles.

This can be related to the fact that some coating agents exhibit pressure-dependent viscosities, are namely thixotropic. The problem associated with this is that a metering of the discharged volume of a coating agent at a nozzle cannot easily be adjusted. During a valve opening time, more or less coating agent can exit than one would expect if, for example, unforeseen fluid-dynamic effects occur as a result of differences in the nozzle geometries.

However, even if a coating agent exhibits a substantially pressure-independent viscosity, differences in the nozzle geometries and nozzle properties can lead to non-uniform or unforeseeable exiting volumes of the coating agent at different nozzles.

SUMMARY

In an embodiment, the present invention provides an application device for coating components with a coating agent, comprising: a print head comprising several individual nozzles configured to discharge the coating agent; and a nozzle valve attached to each individual nozzle, each nozzle valve being openable for a valve opening time to discharge the coating agent from the respective nozzle, wherein each nozzle valve is assigned in each case a nozzle valve supply line, which nozzle valve supply line, at an outlet opening thereof, is configured to supply the coating agent to the respective nozzle valve, and wherein each nozzle valve supply line has an inlet opening which is configured to be closed or shut off such that a quantity of the coating agent that is metered in a defined manner or a volume of the coating agent that is metered in a defined manner is receivable in a closed off manner within the nozzle valve supply line.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 4 shows a table in which the moduli of elasticity and Poisson's ratios of various materials are listed from which a hose described here can be manufactured, FIG. 5 shows tables in which the modulus of elasticity and the Poisson's ratio of a plastic are listed, wherein hose shape factors of various hoses with different radii are calculated and measured on the inside and outside, FIG. 6 shows tables in which the modulus of elasticity and the Poisson's ratio of a plastic are listed, wherein hose shape factors of various hoses with different radii are calculated on the inside and outside, wherein a nozzle resistance and a discharge time for the coating agent are indicated on the basis of a rough estimation and wherein a pressure and a volume of a single drop of the coating agent are indicated, and FIG. 7 shows tables in which the modulus of elasticity and the Poisson's ratio of a plastic are listed, wherein hose shape factors of various hoses with different radii are calculated on the inside and outside, wherein a nozzle resistance and a discharge time for the coating agent are indicated on the basis of a rough estimation and wherein a pressure and a volume of a single drop of the coating agent are indicated.

DETAILED DESCRIPTION

Figure 1:
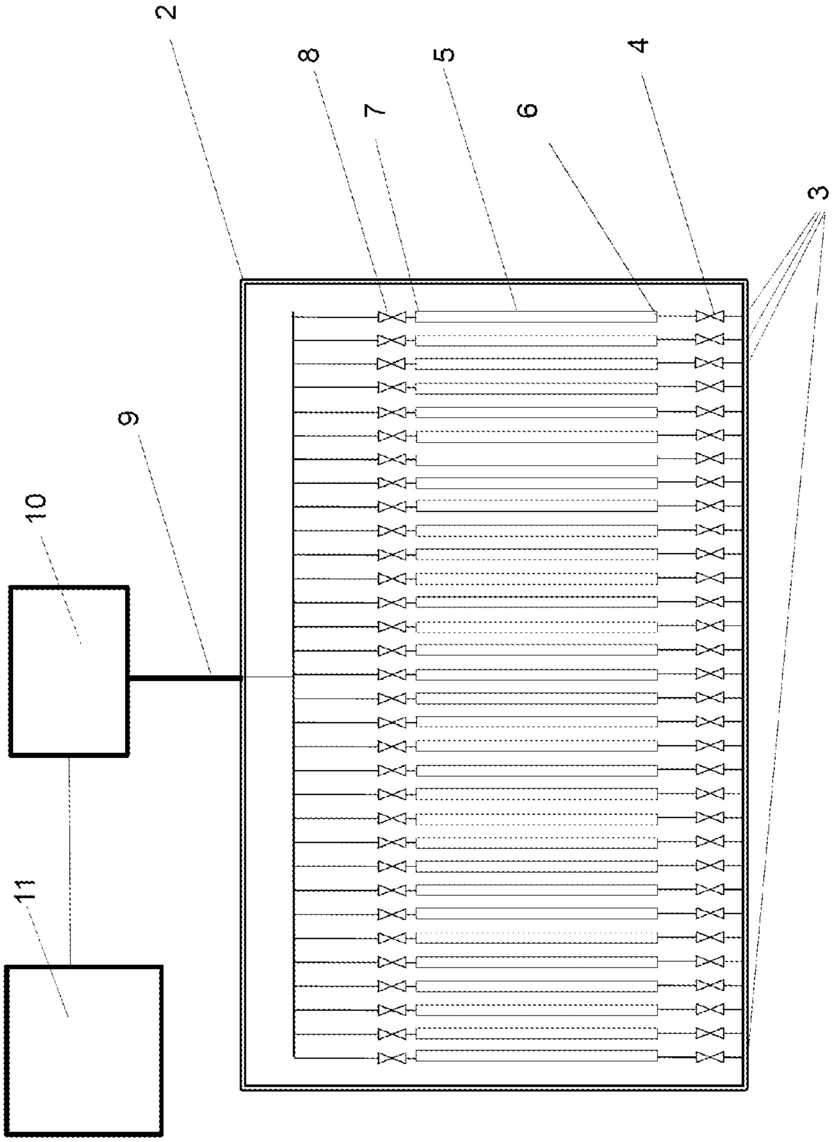
FIG. 1 shows a schematic view of an application device with a print head with 32 nozzles which are arranged parallel to one another, wherein each nozzle is assigned a nozzle valve and a filling valve and wherein a nozzle valve supply line in the form of a hose is arranged between each nozzle valve and each filling valve.

In an embodiment, the present invention provides an improvement of an application device of the above-mentioned type so that in each case a where possible reproducible and foreseeable output quantity of a coating agent occurs during a coating process at several nozzles of the application device arranged in parallel.

According to the invention, each nozzle valve supply line has an inlet opening which can be closed or shut off in such a manner that a quantity that is metered in a defined manner or a volume that is metered in a defined manner of a coating agent can be received in a closed off manner within the nozzle valve supply line.

According to the invention, it has firstly been recognized that each nozzle must be considered individually in terms of the coating agent to be discharged and the characteristics of the nozzle. It has been identified here that this can be carried out in a particularly simple manner if a quantity that has been metered in a defined manner of a coating agent is received in an isolated manner within a respective nozzle valve supply line and the nozzle valve supply line acts as a store. As a result of the pressure conditions which prevail in it, such a store can discharge a clearly defined volume of a coating agent so long as the outlet opening is connected to the nozzle in a fluid-conducting manner. According to the invention, the pressure conditions within each individual system, comprising a nozzle valve and an associated nozzle valve supply line, can be used to generate a reproducible and foreseeable coating agent discharge from the respective nozzle. According to the invention, a reproducible and foreseeable volume of a coating agent from the nozzle can be discharged, and indeed substantially as a function of its technical properties. A stable production method is thus enabled.

The coating agent within the nozzle valve supply line is preferably under a pressure which increases the volume of the interior, which is not under pressure or is under ambient pressure or atmospheric pressure, of the nozzle valve supply line by an expansion volume, wherein the coating agent can be discharged through a nozzle by opening the nozzle valve with a reduction in pressure and wherein the discharged volume of the coating agent corresponds to the expansion volume. As a result of this, it is ensured that a drop or droplet of a coating agent always has the same volume, namely the expansion volume.

According to one advantageous configuration of the invention, the nozzle valve is opened during a valve opening time which is greater than the discharge time of the coating agent which is required to reduce the pressure in the interior of the nozzle valve supply line to ambient pressure or atmospheric pressure and discharge the expansion volume of coating agent. It is ensured by suitable selection of the valve opening time that the total expansion volume is fully discharged.

According to one advantageous configuration of the invention, the inlet opening is assigned a filling valve which, in the opened state, enables a penetration of coating agent into the nozzle valve supply line and, in the closed state, prevents a penetration of coating agent into the nozzle valve supply line. As a result of this, a uniform pressure or a pressure which is suitable for it and its associated nozzle valve can be built up in each nozzle valve supply line by means of a valve control unit which can actuate each filling valve individually. Either a uniform pressure or different pressures can thus prevail in the nozzle valve supply lines before the respective nozzle valves for coating agent discharge are opened. Opening of the nozzle valves or each individual nozzle valve can be carried out with the same or a further valve control unit.

According to a further advantageous configuration of the invention, the nozzle valve supply line is configured to be elastically and/or reversibly deformable and/or with a reversibly changeable volume. As a result of this, the nozzle valve supply line can be expanded in terms of its inner and/or outer diameter and have an expansion volume as an additional volume. It is also conceivable that the nozzle valve supply line is lengthened. The material properties of the respective nozzle valve supply line determine the pressure conditions in its interior. When opening the respective nozzle valve, the pressure or overpressure in the interior of the nozzle valve supply line can be reduced in a reproducible manner as a result of the reversibility of its shape characteristics. It is thus ensured that substantially the same volume of coating agent, namely the expansion volume or additional volume, is always output from the respective nozzle even if this differs in terms of its diameter or other properties from other nozzles.

According to a further advantageous configuration of the invention, the nozzle valve supply line is formed as a hose or tube. A hose or tube is easy to process. The pressure-induced change in shape of a cylindrical hose or tube and thus the expansion volume can thus furthermore be determined relatively easily in terms of computation.

According to a further advantageous configuration of the invention, the nozzle valve supply line is formed as a hose or tube composed of a plastic. Plastics exhibit a low degree of hysteresis behavior and, after a reduction in pressure, assume relatively precisely their initial shape. Nozzle valve supply lines are preferably manufactured from elastomeric plastics.

Against this background, it is, however, also conceivable to manufacture a nozzle valve supply line from a metal if said metal exhibits suitable restoring properties into an initial shape after the reduction in pressure.

According to a further advantageous configuration of the invention, the print head is connected to a central coating agent supply line which is connected or can be connected in a jointly fluid-conducting manner to all filling valves. As a result, the coating agent can be conveyed from a reservoir centrally to a filling valve, wherein, however, a valve control unit controls which filling valve is opened to build up a suitable pressure within a nozzle valve supply line and thus for metering.

All of the filling valves are preferably opened at the same time and the same pressure is built up in all the nozzle valve supply lines. If all the nozzle valve supply lines are formed identically, the receiving capacity of all the nozzle valve supply lines is increased in each case by the same expansion volume or additional volume. All the nozzles arranged in parallel can thus discharge drops of equal size of the coating agent.

According to a further advantageous configuration of the invention, the central coating agent supply line is connected to a pressure control unit. As a result, it can easily be adjusted that each nozzle valve supply line is acted upon with the same pressure if namely a valve control unit simultaneously opens all the filling valves.

According to a further advantageous configuration of the invention, the pressure control unit is connected to an air pressure control unit. As a result of this, it is ensured that there prevails within the nozzle valve supply lines a pressure which exceeds the ambient pressure or atmospheric pressure, namely the air pressure, in a suitable manner so that a reliable discharge of coating agent is performed.

According to a further advantageous configuration of the invention, an arrangement could comprise a robot on which an application device of the type described here is received. A robot, in particular an industrial robot, can be used in coating lines, in particular the automotive industry.

According to a further advantageous configuration of the invention, the robot has a robot arm which is pivotable and/or movable about several axes. Alternatively or additionally, the application device is received on the Tool Center Point (TCP) of the robot arm of the robot. As a result, the application device is easily movable in all spatial directions and pivotable about a plurality of axes.

The application device described here can also be used to carry out a method in the case of which a pressure-controlled discharge of a coating agent from a nozzle is performed until a pressure is reduced and is identical to the ambient pressure. The application device is preferably used for digital coating or for overspraying.

FIG. 1 shows an application device 1 for coating components with a coating agent.

Application device 1 comprises a print head 2 with several nozzles 3 arranged in parallel, from which nozzles the coating agent can be discharged, wherein a nozzle valve 4 is attached to each individual nozzle 3, which nozzle valve can be opened for a valve opening time in order to discharge the coating agent from respective nozzle 3.

Each nozzle valve 4 is assigned in each case a nozzle valve supply line 5 which, at its outlet opening 6, supplies the coating agent to respective nozzle valve 4.

Each nozzle valve supply line 5 has an inlet opening 7 which can be closed or shut off in such a manner that a quantity that is metered in a defined manner or a volume that is metered in a defined manner of a coating agent can be received or is received in a closed off manner within nozzle valve supply line 5.

The received volume that is metered in a defined manner is under a pressure which exceeds the ambient pressure or atmospheric pressure.

The coating agent within nozzle valve supply line 5 is in this regard under a pressure which increases the volume of the interior, which is not under pressure or is under ambient pressure, of nozzle valve supply line 5 by an expansion volume.

The coating agent can be discharged through a nozzle 3 by opening nozzle valve 4 while reducing pressure, wherein the discharged volume of the coating agent corresponds to the expansion volume.

Nozzle valve 4 is opened during a valve opening time which is greater than the discharge time of the coating agent. The discharge time is required to reduce the pressure inside nozzle valve supply line 5 to ambient pressure or atmospheric pressure and discharge the expansion volume of coating agent.

Inlet opening 7 is assigned a filling valve 8 which, in the opened state, enables a penetration of coating agent into nozzle valve supply line 5 and, in the closed state, prevents a penetration of coating agent into nozzle valve supply line 5.

Nozzle valve supply line 5 is configured to be elastically and/or reversibly deformable. Nozzle valve supply line 5 is formed as a hose. Nozzle valve supply line 5 is concretely formed as a hose composed of a plastic.

Print head 2 is connected to a central coating agent supply line 9 which is connected or can be connected in a jointly fluid-conducting manner to all filling valves 8. Central coating agent supply line 9 is connected to a pressure control unit 10. Pressure control unit 10 is connected to an air pressure control unit 11.

Application device 1 can be received on a robot. In concrete terms, the robot could have a robot arm which is pivotable and movable about several axes, wherein the application device 1 is received on the Tool Center Point of the robot arm.

Figure 2:
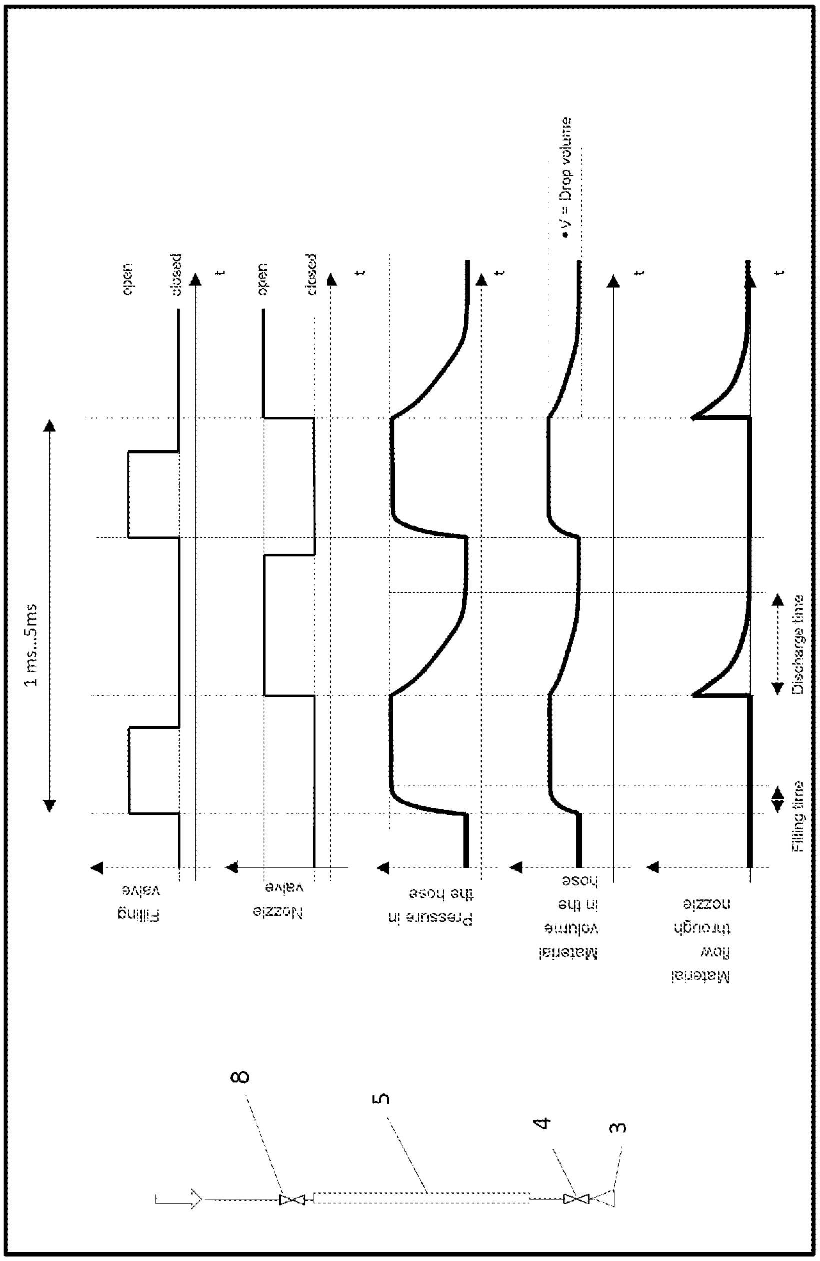
FIG. 2 shows, from top to bottom, a schematic representation and comparison of the time-dependent modes of operation of the filling valves and nozzle valves, wherein the inherent chronological profiles of the pressure and coating agent supply in a hose are represented and wherein the coating agent flow or material flow through a nozzle is represented.

FIG. 2 shows the mode of operation of application device 1 on the basis of various chronological profiles. The uppermost diagram shows that a filling valve 8 is opened and closed twice during a time interval of approximately 5 milliseconds (ms). Associated nozzle valve 4 is opened once in the same time interval if namely associated filling valve 8 connected in series is closed and, prior to opening nozzle valve 4, a quantity metered in a defined manner or a volume metered in a defined manner of coating agent is closed off in nozzle valve supply line 5 and is received under pressure.

The third diagram seen from above in FIG. 2 shows that an increase in pressure occurs in the interior of nozzle valve supply line 5 if nozzle valve 4 is closed and filling valve 8 is opened. The pressure within nozzle valve supply line 5 rises to a value which is predefined by pressure control unit 10. Nozzle valve supply line 5 formed as a hose is expanded by the pressure. The volume of the hose which is not under pressure is increased by an expansion volume.

The expansion volume and thus the volume of coating agent which can additionally be received under pressure within the hose are dependent on the predefined pressure of pressure control unit 10 and on properties of the hose.

The filling time is dependent on the configuration of the valves, in particular their resistance, and the viscosity of the coating agent. The filling time should therefore be sufficiently long to take account of different viscosities.

A filling valve 8 closes after the desired filling of nozzle valve supply line 5, including the filling of edge regions. Both valves 4, 8 are closed for a relatively short period of time.

If nozzle valve 4 is then opened, the coating agent escapes via nozzle 3 until the pressure in nozzle valve supply line 5 is equal to the ambient pressure or atmospheric pressure. The metered output of the coating agent is performed in a quasi pressure-controlled or force-controlled manner.

It can be inferred from FIG. 2 that the discharge time is shorter than the valve opening time during which nozzle valve 4 is opened. The discharge time depends on the configuration of respective nozzle valve 4 and the viscosity of the coating agent. The expansion volume of coating agent or coating which escapes through nozzle 3 is not dependent on the viscosity of the coating agent or the coating. Contaminants or wear effects as well as differences or fluctuations in viscosity therefore have no or almost no influence in the drop volume or droplet volume.

Figure 3:
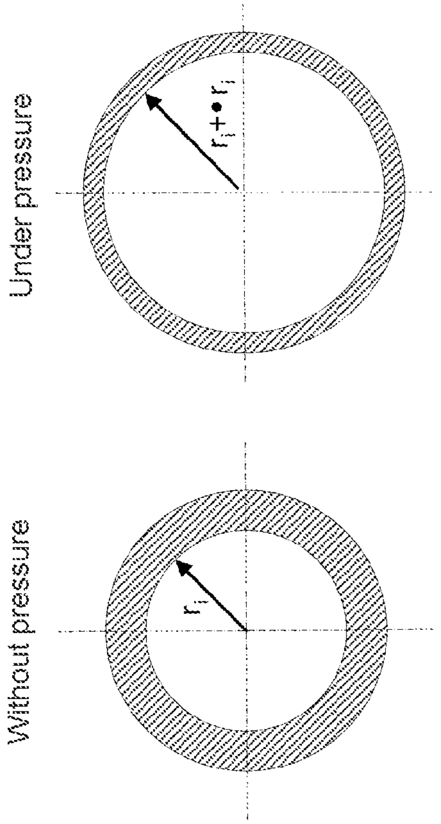
FIG. 3 shows, on the left-hand side, a cross-sectional view of a hose, the interior of which, in the depressurized and relaxed state, has a first radius (radius, inner), and, on the right-hand side, a cross-sectional view of the hose, the interior of which, in the pressurized and tensioned state, has a second radius (enlarged radius, inner)

The expansion volume of coating agent which escapes from a nozzle 3 can be determined on the basis of FIG. 3 and the following formulae.

The following formula indicates how the increase in size of the inner radius of a hose can be determined:

$$\Delta r_i = \frac{p_i}{E} \cdot \frac{r_i^3}{r_a^2 - r_i^2} \cdot \left[(1+\nu)\frac{r_a^2}{r_i^2} + 1 - \nu\right]$$

In the formula v is the Poisson's ratio,

E is the modulus of elasticity, $r_i$ is the inner radius, $r_a$ is the outer radius, $\Delta r_i$ is the increase in size of the radius on the inside by increasing the pressure $p_i$ is the pressure on the inner surface of nozzle valve supply line 5, ΔV is the expansion volume as a result of increase in pressure and C* is a hose shape factor in the case of low pressure.

The expansion volume, namely the increase in the volume in comparison with a hose which is not under pressure, and thus quantity of coating agent which can additionally be received within the hose can be determined on the basis of the following formulae. The hose shape factor can furthermore be determined.

$$\Delta V = \pi \cdot l \cdot \left[\left[r_i + \frac{p_i}{E} \cdot \frac{r_i^3}{r_a^2 - r_i^2} \cdot \left[(1+v)\frac{r_a^2}{r_i^2} + 1 - v\right]\right]^2 - r_i^2\right]$$

$$\text{for } 100 \cdot p_i < E$$

$$\Delta V = 2\pi \cdot l \cdot r_i^2 \cdot \frac{p_i}{E} \cdot \frac{(1+v)r_a^2 + (1-v)r_i^2}{r_a^2 - r_i^2}$$

$$C^* = \frac{\Delta V}{p_i \cdot l} = 2\pi \cdot \frac{r_i^2}{E} \cdot \frac{(1+v) \cdot r_a^2 + (1-v) \cdot r_i^2}{r_a^2 - r_i^2}$$

Tables which list material data and data which are determined computationally or arithmetically are indicated in FIGS. 4 to 7.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

| | |
|---|---|
| 1 | Application device |
| 2 | Print head |
| 3 | Nozzle |
| 4 | Nozzle valve |
| 5 | Nozzle valve supply line |
| 6 | Outlet opening |
| 7 | Inlet opening |
| 8 | Filling valve |
| 9 | Central coating agent supply line |
| 10 | Pressure control unit |
| 11 | Air pressure control unit |

What is claimed is:

1. An application device for coating components with a coating agent, comprising:

a print head comprising several individual nozzles configured to discharge the coating agent; and a nozzle valve attached to each individual nozzle, each nozzle valve being openable for a valve opening time to discharge the coating agent from the respective nozzle, wherein each nozzle valve is assigned in each case a nozzle valve supply line, which nozzle valve supply line, at an outlet opening thereof, is configured to supply the coating agent to the respective nozzle valve, and wherein each nozzle valve supply line has an inlet opening which is configured to be closed or shut off such that a quantity of the coating agent that is metered in a defined manner or a volume of the coating agent that is metered in a defined manner is receivable in a closed off manner within the nozzle valve supply line, each nozzle valve supply line being elastically and/or reversibly deformable.

2. The application device as claimed in claim 1, wherein the coating agent within the nozzle valve supply line is under a pressure which increases a volume of an interior, which is not under pressure or is under ambient pressure, of the nozzle valve supply line by an expansion volume, wherein the coating agent is dischargeable through the respective nozzle by opening the nozzle valve with a reduction in pressure, and wherein a discharged volume of the coating agent corresponds to the expansion volume.

3. The application device as claimed in claim 2, wherein the nozzle valve is openable during a valve opening time which is greater than a discharge time of the coating agent which is required to reduce the pressure in the interior of the nozzle valve supply line to ambient pressure and discharge the expansion volume of coating agent.

4. The application device as claimed in claim 1, wherein the inlet opening is assigned a filling valve which, in an opened state, is configured to enable a penetration of coating agent into the nozzle valve supply line and, in a closed state, to prevent a penetration of coating agent into the nozzle valve supply line.

5. The application device as claimed in claim 1, wherein the nozzle valve supply line is configured to be elastically and/or reversibly deformable and/or with a reversibly changeable volume.

6. The application device as claimed in claim 1, wherein the nozzle valve supply line comprises a hose or tube.

7. The application device as claimed in claim 1, wherein the nozzle valve supply line comprises a hose or tube comprising a plastic.

8. The application device as claimed in claim 1, further comprising:

a plurality of filling valves, each of the plurality of filling valves being connected to a respective nozzle valve supply line, wherein the print head is connected to a central coating agent supply line which is connected or is connectable in a jointly fluid-conducting manner to the plurality of filling valves.

9. The application device as claimed in claim 8, wherein the central coating agent supply line is connected to a pressure control unit.

10. The application device as claimed in claim 9, wherein the pressure control unit is connected to an air pressure control unit.

11. An arrangement, comprising:

the application device as claimed in claim 1; and a robot on which the application device is received.

12. The arrangement as claimed in claim 11, wherein the robot comprises a robot arm which is pivotable and/or movable about several axes, and/or wherein the application device is received on a Tool Center Point of the robot arm of the robot.

* * * * *